United States Patent
Kawamura et al.

(10) Patent No.: US 6,779,360 B2
(45) Date of Patent: Aug. 24, 2004

(54) EJECTOR HAVING THROTTLE VARIABLE NOZZLE AND EJECTOR CYCLE USING THE SAME

(75) Inventors: Susumu Kawamura, Anjo (JP); Takeshi Sakai, Chiryu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/693,134

(22) Filed: Oct. 24, 2003

(65) Prior Publication Data

US 2004/0089019 A1 May 13, 2004

(30) Foreign Application Priority Data

Oct. 25, 2002 (JP) ........................................ 2002-311260

(51) Int. Cl.[7] .................................................. F25B 1/06
(52) U.S. Cl. ......................................... 62/500; 62/191
(58) Field of Search ................................. 62/191, 500

(56) References Cited

U.S. PATENT DOCUMENTS

2003/0145613 A1 * 8/2003 Sakai et al. ................... 62/191

FOREIGN PATENT DOCUMENTS

| JP | 5-312421 | 11/1993 |
| JP | 2003-90635 | 3/2003 |
| JP | 2003-185275 | * 7/2003 |

* cited by examiner

*Primary Examiner*—Melvin Jones
(74) *Attorney, Agent, or Firm*—Harness, Dickey & Pierce, PLC

(57) ABSTRACT

An ejector includes a nozzle and a needle valve formed in a tapered shape. The needle valve controls a throttle opening degree of the nozzle from a minimum degree to a maximum degree while an end section of the needle valve is positioned on a downstream side with respect to a throat section of the nozzle. Besides, a cross-sectional area of a nozzle diffuser is formed to be substantially constant, downstream of the throat section. Thus, a cross-sectional area of a substantial refrigerant passage defined by an inner surface of the nozzle and the needle valve is gradually widened in accordance with the tapered shape of the needle valve. Therefore, pressure loss accompanied with a rapid expanding can be suppressed. As a result, the throttle opening degree of the nozzle can be controlled while improving nozzle efficiency and ejector efficiency.

11 Claims, 7 Drawing Sheets

DISTANCE

DISTANCE

BUTTING SECTION

EJECTOR HAVING THROTTLE VARIABLE NOZZLE AND EJECTOR CYCLE USING THE SAME

CROSS REFERENCE TO RELATED APPLICATION

This application is based on Japanese Patent Application No. 2002-311260 filed on Oct. 25, 2002, the disclosure of which is incorporated herein by reference.

BACKGROUND OF THE INVENTION

1. Field of the Invention

The present invention is related to an ejector (refer to JIS Z 8126 number 2. 1. 2. 3) for transmitting a fluid by entrainment function of a driving fluid jetted at a high speed, and an ejector cycle using the ejector. The ejector has a throttle variable nozzle.

2. Related Art

In an ejector cycle, low-pressure side refrigerant (i.e., refrigerant in an evaporator) circulates by pumping operation of an ejector as generally known. Besides, a suction pressure of refrigerant to be sucked to a compressor is increased while converting expansion energy into pressure energy in the ejector so that power consumption of the compressor is decreased. However, when energy conversion efficiency in the ejector (i.e., ejector efficiency) is decreased, the suction pressure of the compressor cannot be sufficiently increased in the ejector, and power consumption of the compressor cannot be sufficiently decreased. Besides, a sufficient amount of the refrigerant cannot be circulated into the evaporator.

On the other hand, when a nozzle inside the ejector is a kind of a fixed throttle, an amount of the refrigerant flowing into the nozzle has a fluctuation, and nozzle efficiency and ejector efficiency vary in accordance with the fluctuation. Here, the nozzle efficiency is a conversion efficiency when pressure energy is converted to speed energy in the nozzle. Ideally, a throttle opening degree of the nozzle is preferred to be variably controlled in accordance with a flow amount of refrigerant. However, according to experiments by the inventors of the present invention, when the throttle opening degree of the nozzle is simply changed, the nozzle efficiency may be considerably deteriorated.

SUMMARY OF THE INVENTION

It is an object of the present invention to provide an ejector capable of controlling its nozzle throttle opening degree while improving the nozzle efficiency.

According to a first aspect of the present invention, an ejector includes a nozzle having an inner wall surface for defining a fluid passage through which a drive fluid flows, a pressurizing section in which a fluid is sucked by entrainment of a jet flow of the drive fluid jetted from the nozzle and is mixed with the drive fluid jetted from the nozzle, and a needle valve for changing a throttle opening degree of the fluid passage in the nozzle. Further, the nozzle includes a throat section having a cross-sectional area (i.e., inner diameter) that is the smallest in the fluid passage, and the needle valve is disposed to be displaced in an axial direction in the fluid passage of the nozzle. In addition, the needle valve has an end section formed in a tapered shape so that a cross-sectional area of the needle valve decreases toward a top end of the needle valve, the end section of the needle valve reaches to a downstream side of the throat section in a flow direction of the drive fluid at least when the throttle opening degree is minimum, and the fluid passage of the nozzle has a substantially constant cross-sectional area in a downstream section downstream from the throat section.

Accordingly, a cross-sectional area of a substantial refrigerant passage defined by an inner wall surface of the nozzle and the needle valve in the downstream section is gradually increased in accordance with the tapered shape of the needle valve. Therefore, it can prevent a pressure loss due to a rapid expansion of the passage area in the nozzle. Thus, it is possible to control the throttle opening degree of the nozzle while the nozzle efficiency can be improved. Further, the fluid passage of the nozzle has a substantially constant cross-sectional area, in a downstream section downstream from the throat section. Therefore, it is no need to form a diffuser section having a gradually increasing inner diameter. Thus, the nozzle having the throat section can be readily formed.

According to a second aspect of the present invention, the fluid passage is formed into a tapered shape having a cross-sectional area that is gradually decreased by a taper angle θ1 toward an outlet of the fluid from a downstream side of the throttle section to at least the throat section, and the taper angle θ1 of the fluid passage is smaller than a taper angle θ2 of the tapered end section of the needle valve. Therefore, the cross-sectional area of the substantial refrigerant passage defined by the inner wall surface of the nozzle and the needle valve in the downstream section can be gradually increased in accordance with the tapered shape of the needle valve. In the present invention, the fluid passage can be formed into a multi-step tapered shape tapered in multiple steps.

Preferably, the throat section has an inner periphery surface formed in a curved shape. In this case, the passage sectional area of the fluid passage can be continuously smoothly changed. More preferably, the top end of the needle valve reaches to the downstream side of the fluid flow with respect to the throat section even when the throttle opening degree is maximum. Further, the end section of the needle valve can be formed into a conical tapered shape, or can be formed in a hanging bell shape.

Further, the ejector of the present invention can be effectively used for an ejector cycle. In this case, the nozzle of the ejector decompresses refrigerant flowing from a high-pressure heat exchanger, and the refrigerant in an evaporator (low-pressure heat exchanger) is sucked into the pressurizing portion by entrainment of a jet flow of the refrigerant jetted from the nozzle and is mixed with the refrigerant jetted from the nozzle in the pressurizing portion. In this case, the opening degree of the nozzle can be controlled without reducing the nozzle efficiency and ejector efficiency. Therefore, the ejector cycle can be effectively operated.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

An ejector in this embodiment related to the present invention is typically used in an ejector cycle for a vehicle air conditioner.

Figure 1:
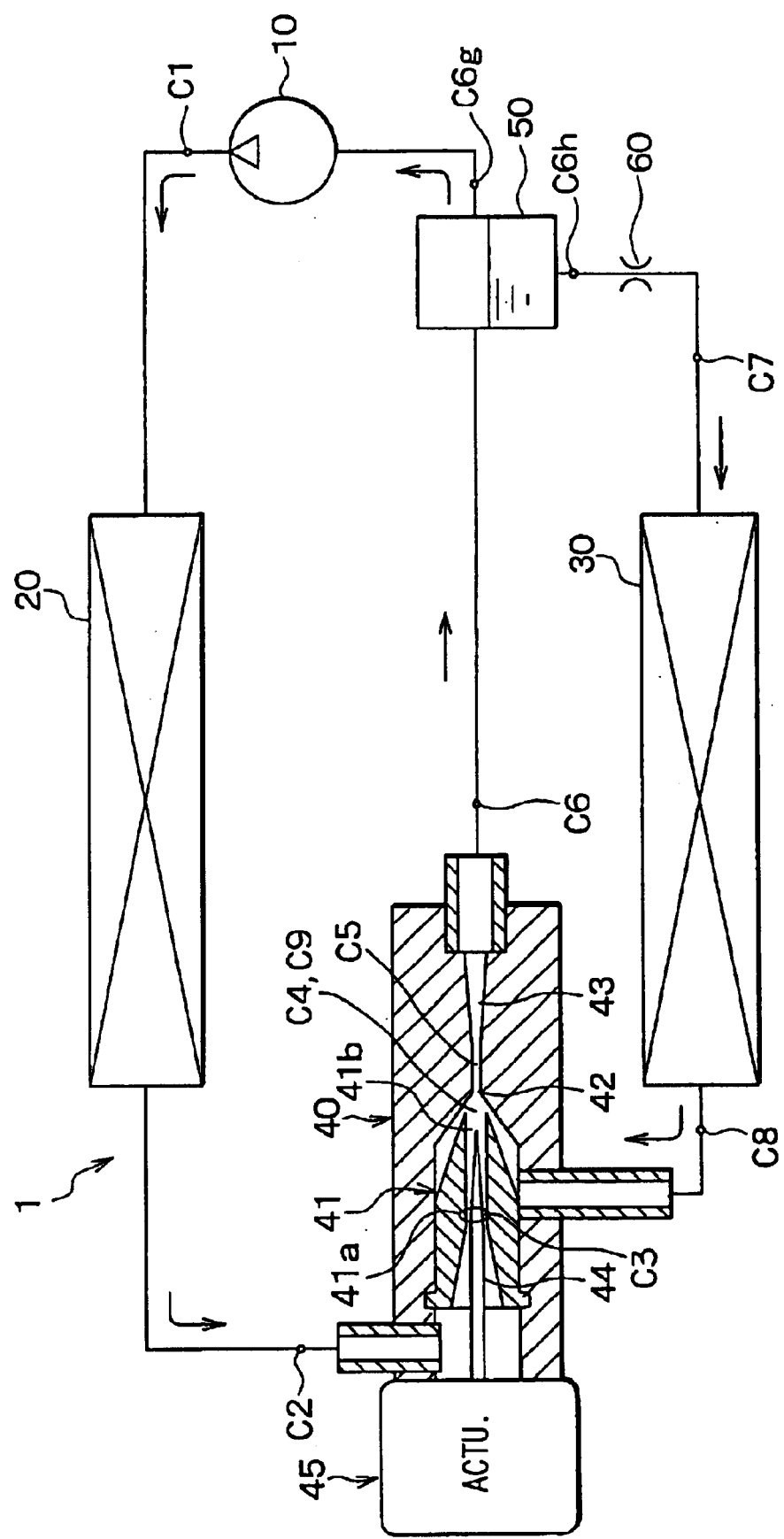
FIG. 1 is a schematic diagram showing an ejector cycle according to an embodiment of the present invention.

FIG. 1 shows a schematic diagram of an ejector cycle 1 using carbon dioxide as refrigerant. A compressor 10 is a variable displacement compressor for sucking and compressing refrigerant, and is driven by a vehicle engine for running. A discharge capacity of the compressor 10 is controlled so that a temperature or a pressure in an evaporator 30 (described later) is controlled within a predetermined range.

A radiator 20 is a high-pressure side heat exchanger for cooling refrigerant by performing heat-exchange between refrigerant discharged from the compressor 10 and outside air (i.e., air outside a passenger compartment). The evaporator 30 is a low-pressure side heat-exchanger for cooling air to be blown toward the passenger compartment by performing heat-exchange between air to be blown toward the passenger compartment and liquid refrigerant while evaporating the liquid refrigerant.

The ejector 40 sucks gas refrigerant evaporated in the evaporator 30 while decompressing and expanding refrigerant flowing from the radiator 20, and increases suction pressure of refrigerant to be sucked to the compressor 10 by converting expansion energy into pressure energy. Detail will be described later.

Refrigerant flowing out of the ejector 40 flows into a gas-liquid separator 50. The gas-liquid separator 50 separates the inflow refrigerant into gas refrigerant and liquid refrigerant, and is used for accumulating the liquid refrigerant. A gas refrigerant outlet port of the gas-liquid separator 50 is connected with a suction inlet of the compressor 10, and a liquid refrigerant outlet port is connected with an inlet of the evaporator 30. A throttle 60 is a decompressing means for decompressing liquid refrigerant flowing out of the gas-liquid separator 50.

Figure 2A:
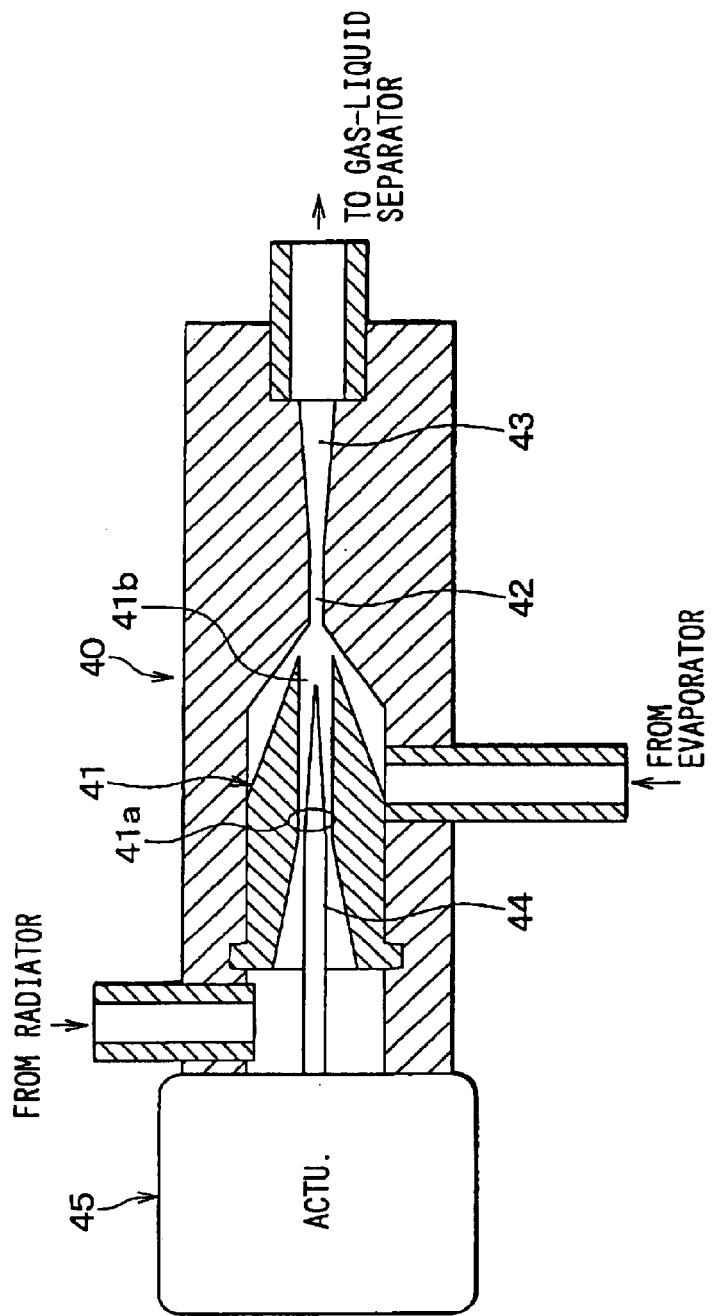
FIG. 2A is a schematic sectional view showing an ejector according to the embodiment of the present invention.
Figure 2B:
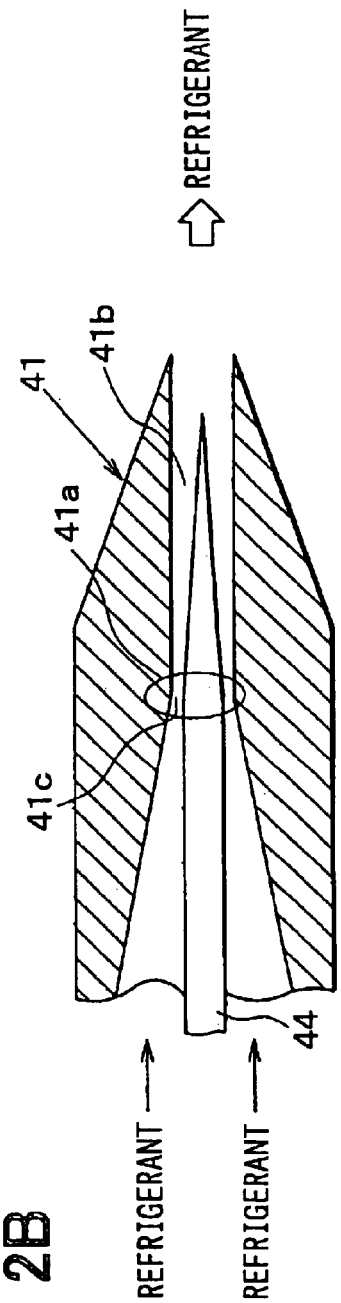
FIG. 2B is a schematic enlarged view showing a part of a nozzle of the ejector in FIG. 2A.

Next, the ejector will be now described in detail. As shown in FIG. 2, the ejector 40 includes a nozzle 41, a mixing section 42 and a diffuser 43 and so on. The nozzle 41 converts pressure energy of the high-pressure refrigerant to speed energy of the refrigerant, and decompresses and expands the refrigerant isentropicly. The mixing section 42 mixes high-speed refrigerant jetted from the nozzle 41 and gas refrigerant sucked from the evaporator 30. The gas refrigerant evaporated in the evaporator 30 is sucked by entrainment function of a high-speed refrigerant flow jetted from the nozzle 41. The diffuser 43 further mixes the refrigerant jetted from the nozzle 41 and the refrigerant sucked from the evaporator 30 and converts the speed energy of the mixed refrigerant into pressure energy, so as to increase refrigerant pressure to be sucked to the compressor 10.

Here, the refrigerant flow jetted from the nozzle 41 and the refrigerant flow sucked into the ejector 40 from the evaporator 30 are mixed inside the mixing section 42, while the sum of both the momentums is conserved. Hence, the static pressure of the refrigerant increases in the mixing section 42. On the other hand, the dynamic pressure of the refrigerant is converted into the static pressure by gradually increasing the cross-sectional area of the refrigerant passage in the diffuser 43. Therefore, refrigerant pressure increases in both of the mixing section 42 and the diffuser 43 in the ejector 40. Accordingly, the mixing section 42 and the diffuser 43 are generically named as a pressurizing section. That is, preferably, refrigerant pressure increases in the mixing section 42 so that sum of the momentums of the two kinds of the refrigerant flows are conserved, and refrigerant pressure increases in the diffuser 43 so that energy is conserved in an ideal ejector 40.

Here, the nozzle 41 is a Laval nozzle (refer to the "fluid engineering" published by Tokyo University Publication). The Laval nozzle has a throat section 41a in which the passage area of the refrigerant passage defined by an inner wall surface of the nozzle 41 is mostly reduced in the midstream thereof, and a nozzle diffuser 41b after the throat section 41a. A substantial refrigerant passage is defined by the inner wall surface of the nozzle 41 and a needle valve 44. The throttle opening degree of the nozzle 41 (i.e., minimum cross-sectional area of the substantial minimum refrigerant passage), is controlled by the needle valve 44 that is displaced by an actuator 45 inside the nozzle 41 in an axial direction of the nozzle 41. In this embodiment, the nozzle 41 and the needle valve 44 are provided such that the cross-sectional area of the substantial refrigerant passage is gradually increased in the nozzle diffuser 41b toward downstream from the throat section 41a.

In detail, an inner diameter of the refrigerant passage in the nozzle 41 on a downstream side of the refrigerant flow with respect to the throat section 41a, that is, an inner diameter of the nozzle diffuser 41b (i.e., cross-sectional area of the refrigerant passage in the nozzle diffuser 41b) is formed to be approximately constant. Besides, an end section of the needle valve 44 is formed into a conical tapered shape decreasing its cross-sectional area toward its top end (downstream end). The needle valve 44 controls the throttle opening from a minimum degree up to a maximum degree within a range where the end section of the needle valve 44 is positioned on the downstream side of the refrigerant flow with respect to the throat section 41a.

In this embodiment, the inner diameter of the nozzle diffuser 41b is made constant so that a position of a throttle section 41c is equivalent to a position of the throat section 41a. Here, throttle section 41c is a section having a minimum cross-sectional area in the substantial refrigerant passage defined by the needle valve 44 and the inner wall surface of the nozzle 41.

In the present embodiment, an electric actuator such as a stepping motor with a thread mechanism or a linear solenoid or the like is used as the actuator 45. Besides, a temperature of high-pressure side refrigerant is detected by a temperature sensor (not shown), and the throttle opening degree of the nozzle 41 is controlled so that the pressure of high-pressure side refrigerant detected by a pressure sensor (not shown) is approximated to a target pressure determined by the temperature detected by the temperature sensor.

Figure 3:
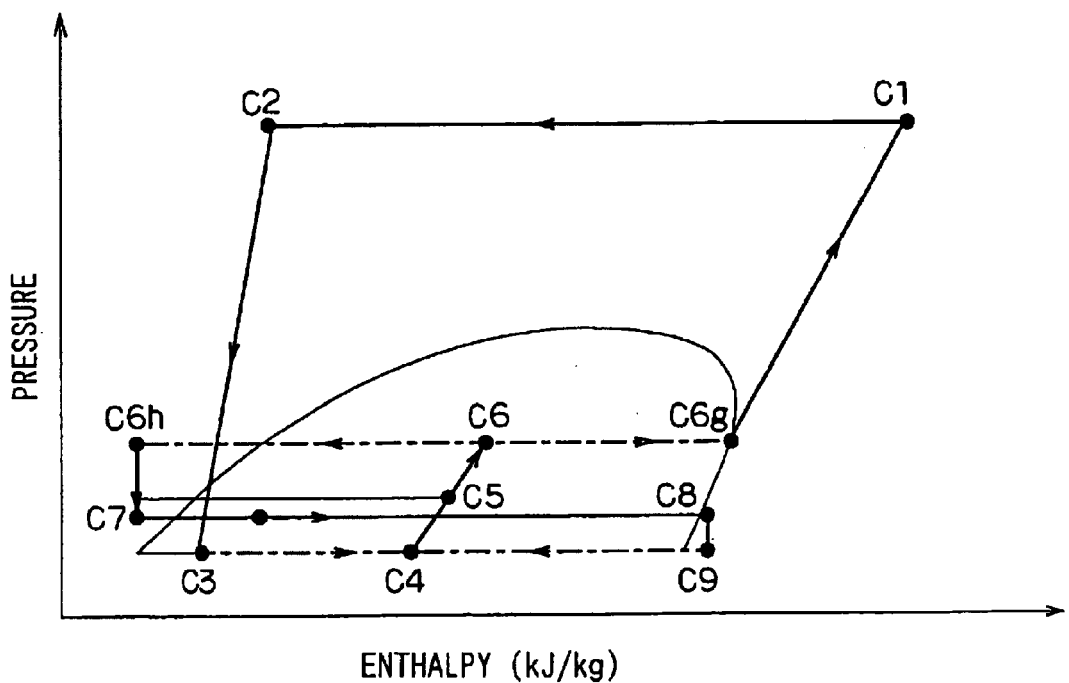
FIG. 3 is a Mollier diagram (p-h diagram) showing a relationship between a refrigerant pressure and an enthalpy in the ejector cycle for explaining an operation of the ejector cycle.

Here, the target pressure of the high-pressure side refrigerant is set so that the coefficient of performance of the ejector cycle becomes maximum with respect to the temperature of the high-pressure side refrigerant. In the present embodiment as shown in FIG. 3, if heat load is high, the throttle opening degree of the nozzle 41 is controlled so that pressure of the high-pressure refrigerant flowing into the nozzle 41 is increased higher than critical pressure of the refrigerant. When heat load is low, the throttle opening degree of the nozzle 41 is controlled so that the pressure of the high-pressure refrigerant flowing into the nozzle 41 has a predetermined super-cool degree under a condition where the pressure of the high-pressure refrigerant is lower than its critical pressure.

Next, general operation of the ejector cycle will be now described. In the ejector cycle, reference numbers C1–C9 shown in FIG. 3 indicate refrigerant states at positions indicated by reference numbers C1–C9 shown in FIG. 1, respectively. Refrigerant discharged from the compressor 10 circulates to the radiator 20. Refrigerant cooled in the radiator 20 is decompressed and expanded in the nozzle 41 of the ejector 40 isentropicly, and flows into the mixing section 42 at a speed higher than the sound speed. Refrigerant evaporated in the evaporator 30 is sucked into the mixing section 42 by pumping operation caused by entrainment function with high-speed refrigerant flowing into the mixing section 42. Therefore, low-pressure side refrigerant circulates in this order of the gas-liquid separator 50→the throttle 60→the evaporator 30→the pressurizing section 42, 43 of the ejector 40→the gas-liquid separator 50. On the other hand, refrigerant sucked from the evaporator 30 (suction flow) and refrigerant discharged from the nozzle 41 (driving flow) are mixed in the mixing section 42 while converting its dynamic pressure into static pressure in the diffuser 43, and thereafter return to the gas-liquid separator 50.

Figure 4:
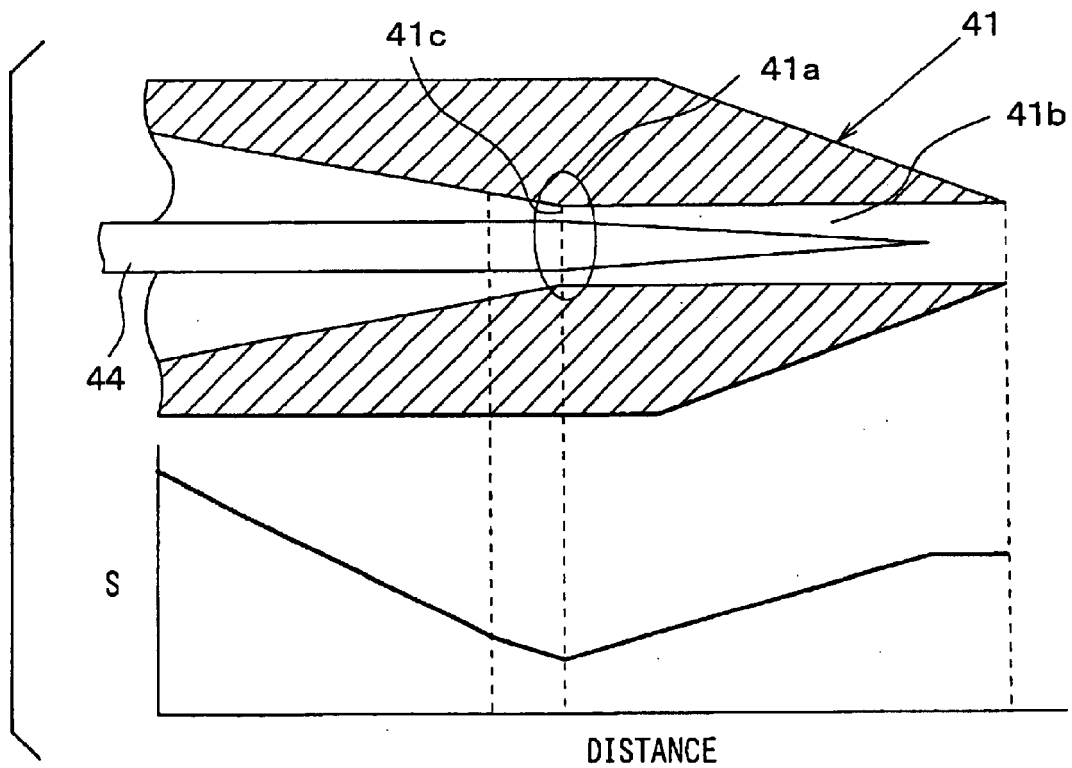
FIG. 4 is a schematic diagram for explaining an effect of the ejector according to the first embodiment.

Next, the characteristics of the present invention will be now described. In the present embodiment, the end section of the needle valve 44 is formed into a tapered-shape that decreases its cross-sectional area toward its top end. At least when its throttle opening is minimally set, the end section of the needle valve 44 reaches to downstream side of the refrigerant flow with respect to the throat section 41a. Additionally, the cross-sectional area of the nozzle diffuser 41b is approximately constant so that the cross-sectional area S of the substantial refrigerant passage of the nozzle diffuser 41b gradually increases toward the downstream end in accordance with the tapered shape of the needle valve 44 as shown in FIG. 4. Therefore, loss caused by a rapid expanding of the substantial refrigerant passage after the throat section 41a can be suppressed. Accordingly, the throttle opening degree of the nozzle 41 can be controlled without decreasing nozzle efficiency and ejector efficiency.

Figure 11:
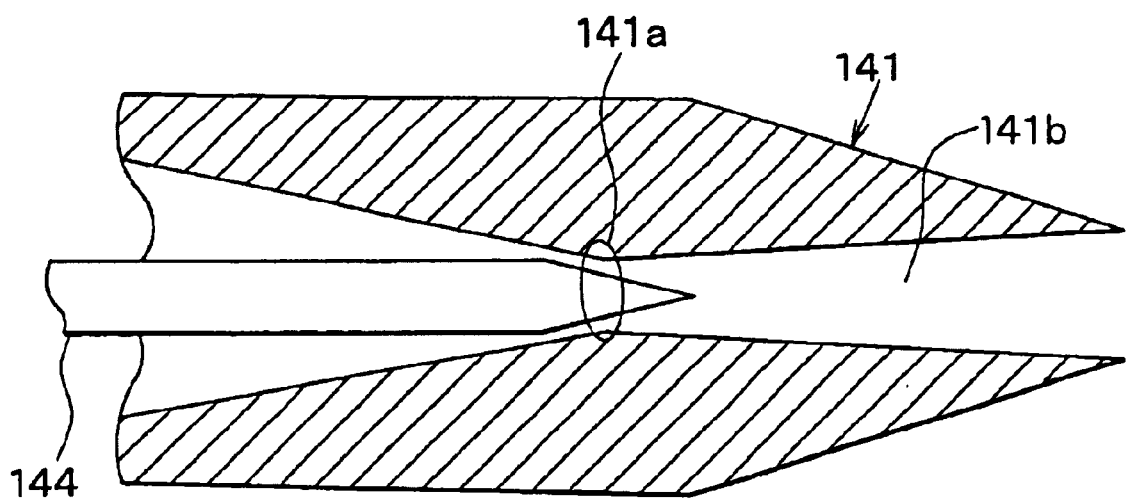
FIG. 11 is a schematic sectional view showing an ejector according to a related art.

FIG. 11 shows a comparison example of a throttle variable nozzle 141. The throttle variable nozzle 141 is a Laval nozzle including a throat section 141a having a cross-sectional area that is the smallest in a refrigerant passage of the nozzle 141, a nozzle diffuser 141b gradually increasing cross-sectional area of the refrigerant passage therein toward a downstream side after the throat section 141a, and a needle valve 144 having an end section shaped as a tapered cone. However, the throttle variable nozzle 141 has the following problem.

Figure 12:
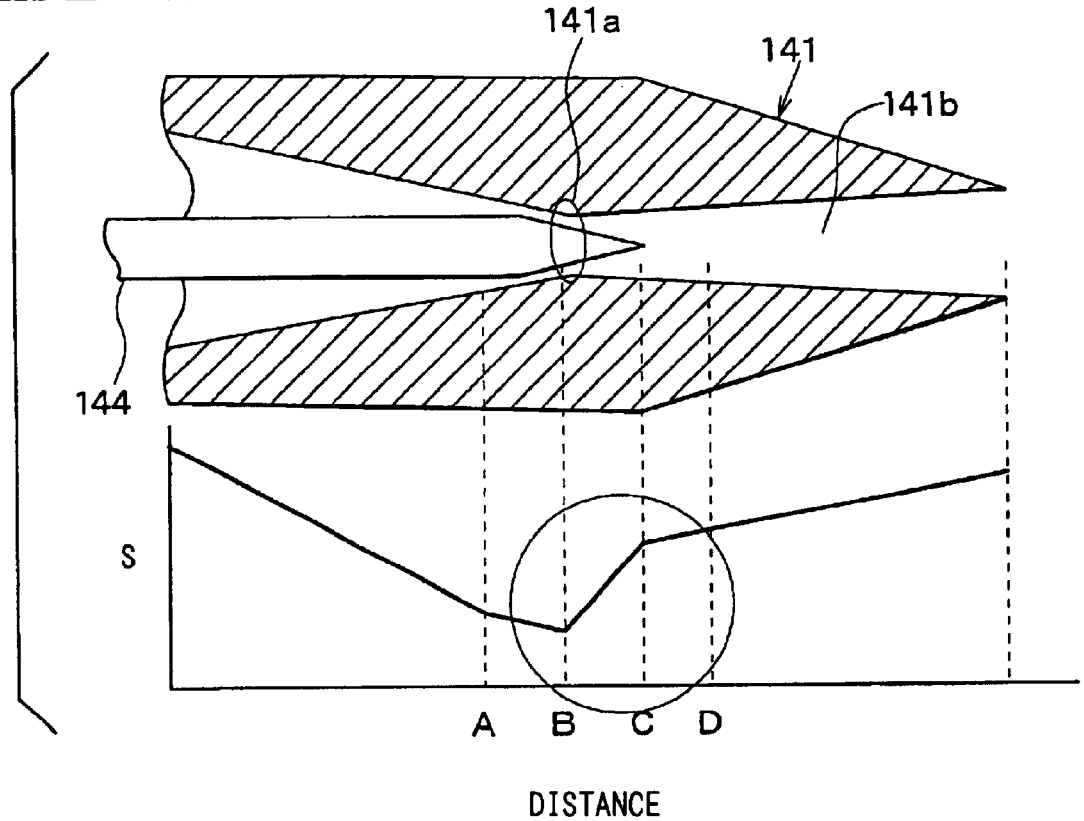
FIG. 12 is a schematic diagram for explaining a problem of the ejection in the related art.

As shown in FIG. 12, a cross-sectional area S of a substantial refrigerant passage in the nozzle 141 is rapidly changed in the B-C area in its axial direction. The outer peripheral surface of the needle valve 44 is mostly approximated to an inner peripheral surface of the nozzle 141 in a throttle section B. A point C corresponds to the top end of the needle valve 144. In this case, the cross-sectional area of the substantial refrigerant passage increases quickly from the throttle section B to the point C comparing with the C-D area which is a downstream of the throttle section B. Accordingly, pressure loss causes by the rapid expanding, so nozzle efficiency and ejector efficiency are deteriorated.

Figure 13:
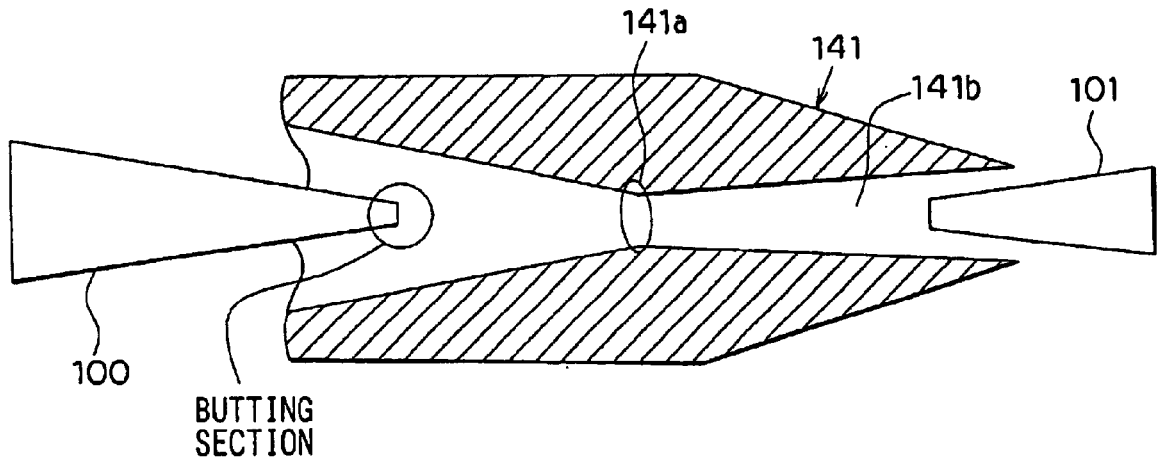
FIG. 13 is a schematic sectional for explaining a problem in a manufacturing method of the ejector in the related art.

Further, as shown in FIG. 13, when the nozzle 141 is manufactured in the manner of sintering or the like, a die 100 is inserted from the inlet side of the nozzle 141 and a die 101 is inserted from the outlet side of the nozzle 141 to be butted in the throat section 141a. The throat section 141a is a section required to be manufactured most precisely in the nozzle 141, however, it is difficult to keep high manufacturing accuracy by the manufacturing method such as the butting of the two dies 100, 101, and a yield rate of the nozzle 141 is possible to be decreased. When the nozzle 141 is manufactured by machining work, boring needs to be performed from the inlet side of the nozzle 141 and from the outlet side of the nozzle 141. As same as manufacturing the nozzle 141 by sintering, it is difficult to keep manufacturing accuracy in the throat section 141a, and a yield rate of the nozzle 141 is possible to be decreased.

Figure 5:
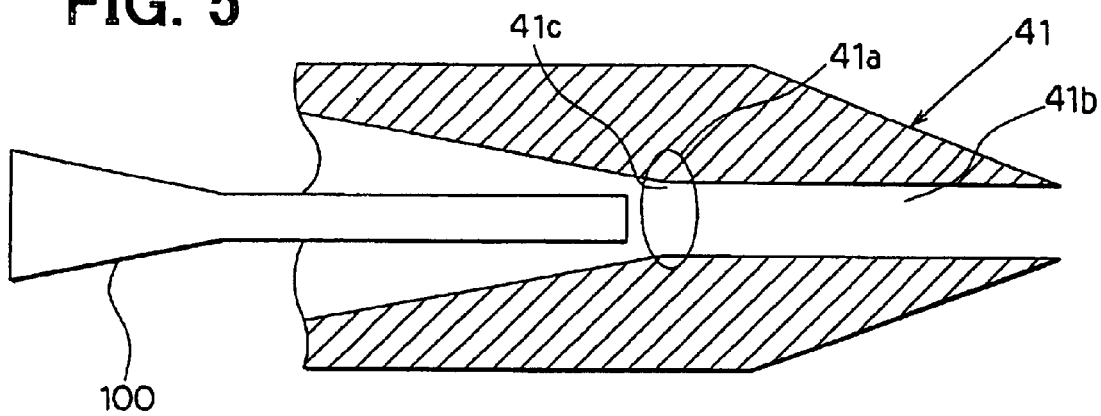
FIG. 5 is a schematic sectional view showing a manufacturing method of the ejector according to the first embodiment.

On the contrary, the cross-sectional area of the refrigerant passage in the nozzle diffuser 41b is approximately constant in the present embodiment. Thus, when the nozzle 41 is manufactured by sintering or the like as shown in FIG. 5, refrigerant passage can be formed inside the nozzle 41 by a die 100 inserted from the inlet of the nozzle 41. Thus, high manufacturing accuracy of the throat section 41a can be kept easily so that yield rate of the nozzle 41 can be enhanced. When the nozzle 41 is manufactured by machining work, boring work can be performed from the inlet side of the nozzle 41 for forming the refrigerant passage. Thus, high manufacturing accuracy of the throat section 41a can be kept easily, so that yield rate of the nozzle 41 can be enhanced.

According to the first embodiment, it is no need to form a diffuser section gradually increasing its inner diameter after the throat section 41a. Thus, the nozzle 41 can be manufactured easily, and production cost of the nozzle 41 according to the present invention can be reduced while keeping high manufacturing accuracy. Besides, throttle opening degree of the nozzle 41 can be controlled while the nozzle efficiency and the ejector efficiency can be improved.

Second Embodiment

Figure 6:
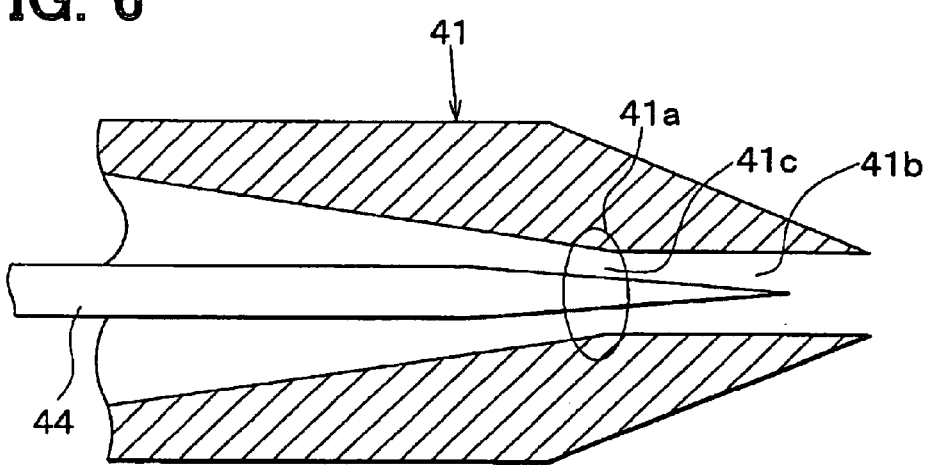
FIG. 6 is a schematic sectional view showing an ejector according to a second embodiment of the present invention.

In the second embodiment as shown in FIG. 6, the shape of the inner wall of the throat section 41a in the nozzle 41 according to the first embodiment is formed in a curved surface, so that cross-sectional area of the refrigerant passage varies continuously and smoothly from the refrigerant inlet of the nozzle 41 to the throat section 41a. Thus, vortex generation can be decreased in the downstream side near the throat section 41a, so that loss such as a vortex loss or the like can be decreased. Accordingly, the nozzle efficiency can be further increased. In the second embodiment, the other parts are similar to those of the above-described first embodiment.

Third Embodiment

Figure 7:
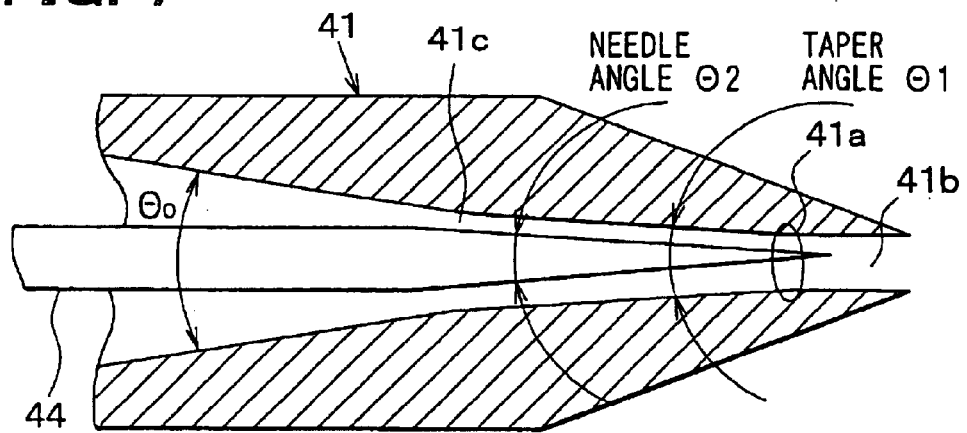
FIG. 7 is a schematic sectional view showing an ejector according to a third embodiment of the present invention.

In the above-described first embodiment of the present invention, the cross-sectional area of the refrigerant passage gradually decreases by a constant taper angle from the refrigerant inlet of the nozzle 41 to the throat section 41a. However, in this embodiment, as shown in FIG. 7, a taper angle θ1 on a side of the throat section 41a of the nozzle 41 is set to be smaller than a taper angle θ0 on the refrigerant inlet side of the nozzle 41 and the a taper angle θ2 of the end section of the needle valve 44. Besides, the needle valve 44 controls the throttle opening degree from a minimum degree to a maximum degree while at least the top end of the needle valve 44 is positioned on the downstream side of the throat section 41a in the refrigerant flow.

In this embodiment, the taper angle θ1 of the throat section 41a is smaller than the taper angle θ0 of the refrigerant inlet side of the nozzle 41, and the position of the throttle section 41c is on the upstream side of the refrigerant flow with respect to the position of the throat section 41a. Therefore, upstream side of the refrigerant flow with respect to the throat section 41a after the throttle section 41c works as a part of the nozzle diffuser 41b as described below. An inner diameter of the refrigerant passage in the nozzle 41 on the downstream side of the refrigerant flow with respect to the throat section 41a is approximately constant similarly to the first embodiment. Therefore, refrigerant flowing into the nozzle 41 increases its speed up to the sound speed. A cross-sectional area of the substantial refrigerant passage S increases in the downstream of the throttle section 41c so that the refrigerant partially boils and increases its speed over the sound speed.

In this embodiment, the taper angle θ2 of the end section of the needle valve 44 is smaller than the taper angle θ0 of the refrigerant inlet side of the nozzle 41. However, this embodiment is not limited to the relation of the taper angles.

Figure 8:
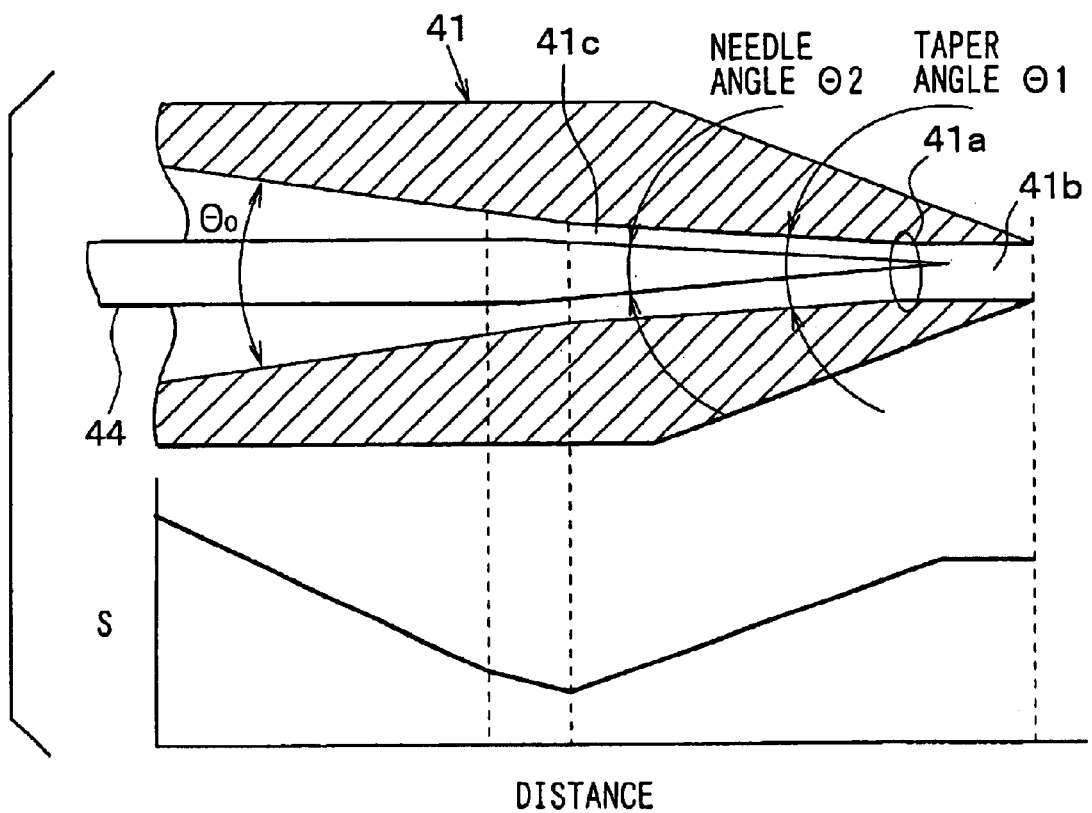
FIG. 8 is a schematic diagram for explaining an effect of the ejector according to the third embodiment.

Next, characteristics of this embodiment are described. At least when the throttle opening becomes minimum, the top end section of the needle 44 reaches to the downstream side of the refrigerant flow with respect to the throttle section 41c, and the taper angle θ1 on the downstream side with respect to the throttle section 41c in the refrigerant passage of the nozzle 41 is smaller than the taper angle θ2 on the end section of the needle valve 44. Therefore, cross-sectional area S of the substantial refrigerant passage in the nozzle diffuser 41b gradually expands in accordance with the tapered shape of the needle valve 44 as shown in FIG. 8. Therefore, loss caused by the rapid expanding after the throttle section 41c can be decreased, and throttle opening degree of the nozzle 41 can be controlled without considerable decreasing the nozzle efficiency and the ejector efficiency.

Furthermore, production cost of the nozzle 41 can be decreased while keeping high manufacturing accuracy similarly to the first embodiment, because a nozzle diffuser section gradually widening its inner diameter after the throat section 41a is not necessary to be formed.

In the third embodiment, the cross-sectional area of the nozzle diffuser 41b downstream from the throat section 41a can be made substantially constant.

Fourth Embodiment

Figure 9:
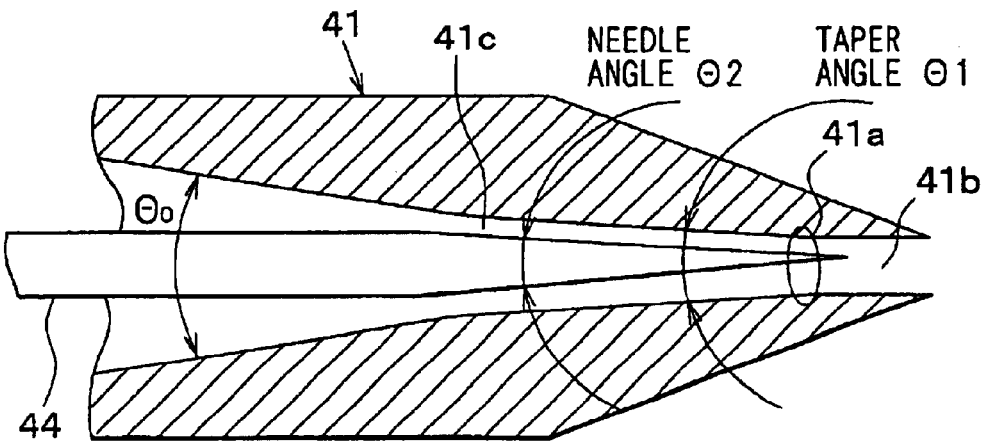
FIG. 9 is a schematic sectional view showing an ejector according to a fourth embodiment of the present invention.

In the fourth embodiment as shown in FIG. 9, the shape of the inner wall of the throat section 41a in the nozzle 41 according to the third embodiment is formed with a curved surface. Thus, cross-sectional area of the refrigerant passage varies continuously and smoothly from the refrigerant inlet of the nozzle 41 to the throat section 41a. Thus, generation of a loss by a vortex or the like can be decreased, so that the nozzle efficiency can be enhanced. In the fourth embodiment, the other parts are similar to those of the above-described third embodiment.

Fifth Embodiment

Figure 10:
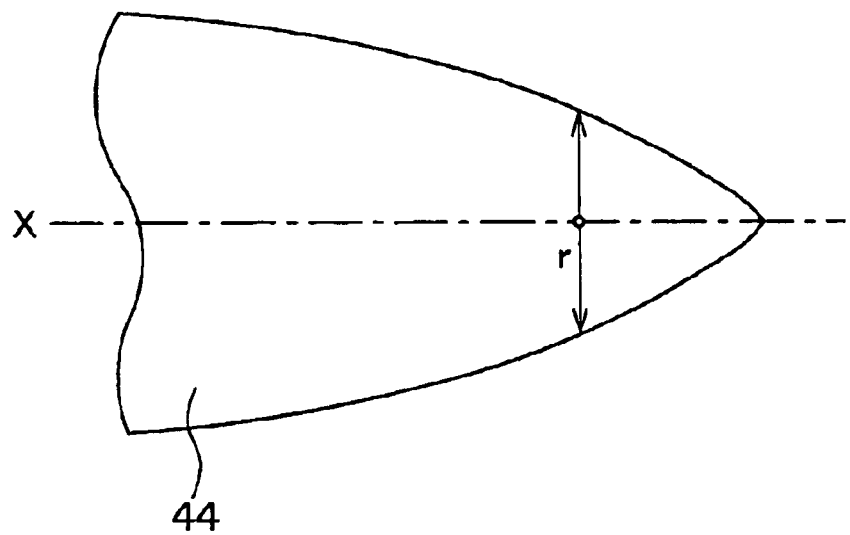
FIG. 10 is a schematic diagram for explaining a shape of an end section of a needle valve according to a fifth embodiment of the present invention.

In the above-described embodiments of the present invention, the end section of the needle valve 44 is formed in a conical tapered shape. However, in the fifth embodiment, the end shape of the needle valve 44 can be formed as shown in FIG. 10. In the fifth embodiment, as shown in FIG. 10, the end shape of the needle valve 44 is formed so that the second order differential value of a radial dimension r relative to an axial position X becomes less than zero. That is, the shape of the needle valve 44 is formed in a hanging bell shape. Changing rate of the diameter r becomes smaller toward its end, and tangent of the outline of the needle valve 44 becomes approximately perpendicular to the axis line X.

The Other Embodiments

Although the present invention has been fully described in connection with the preferred embodiments thereof with reference to the accompanying drawings, it is to be noted that various changes and modifications will become apparent to those skilled in the art.

For example, in the above-described embodiments, the present invention is applied to an air conditioner for a vehicle. However, the present invention is not limited to be applied to an air conditioner. The present invention can be applied to a refrigerator, a freezing apparatus, a hot water supplying apparatus and other ejector cycles.

The actuator 45 is not limited to the examples shown in the embodiments described above. For example, a mechanical actuator using a gas-pressure of an inert gas and a non-electromagnetic actuator such as an electric actuator using a piezo device can be used.

In the above embodiments, the pressure of the high-pressure side refrigerant is set higher than the critical pressure of the refrigerant by using carbon dioxide as refrigerant. However, refrigerant in the present invention is not limited to carbon dioxide. Chlorofluorocarbons (R134a) can be used as refrigerant so that refrigerant pressure on the high-pressure side becomes less than critical pressure of the refrigerant, for example. Further, the other fluid can be used as the refrigerant.

Additionally, the refrigerant passage can be formed into a multi-step tapered shape. That is, in reference to FIG. 9, the taper angle θ1 on the downstream side with respect to the throttle section 41c in the refrigerant passage of the nozzle 41 can be changed in plural steps toward the outlet. In this case, as same as the above embodiments, cross-sectional area S of the substantial refrigerant passage in the nozzle diffuser 41b gradually expands, so that loss caused by the rapid expanding after the throttle section 41c can be decreased, and throttle opening degree of the nozzle 41 can be controlled without considerable decreasing the nozzle efficiency and the ejector efficiency.

In the above-described embodiment, the refrigerant in the ejector cycle flows through the ejector. However, a fluid other than the refrigerant can be used in the ejector.

Such changes and modifications are to be understood as being within the scope of the present invention as defined by the appended claims.

What is claimed is:

1. An ejector comprising:
   a nozzle having an inner wall surface for defining a fluid passage through which a drive fluid flows, the nozzle including a throat section having a cross-sectional area that is the smallest in the fluid passage;
   a pressurizing section in which a fluid is sucked by entrainment of a jet flow of the drive fluid jetted from the nozzle and is mixed with the drive fluid jetted from the nozzle; and a needle valve for changing a throttle opening degree of the fluid passage, the needle valve being disposed to be displaced in an axial direction in the fluid passage of the nozzle, wherein:

the needle valve has an end section formed in a tapered shape so that a cross-sectional area of the needle valve decreases toward a top end of the needle valve;

the end section of the needle valve reaches to a downstream side of the throat section in a flow direction of the drive fluid at least when the throttle opening degree is minimum; and the fluid passage of the nozzle has a substantially constant cross-sectional area, in a downstream section downstream from the throat section.

2. An ejector according to claim 1, wherein the top end of the needle valve reaches to the downstream side of the fluid flow with respect to the throat section even when the throttle opening degree is maximum.

3. An ejector according to claim 1, wherein the end section of the needle valve is formed into a conical tapered shape.

4. An ejector according to claim 1, wherein the end section of the needle valve is formed in a hanging bell shape.

5. An ejector comprising:

a nozzle having an inner wall surface for defining a fluid passage through which a drive fluid flows, the nozzle including a throat section having a cross-sectional area that is the smallest in the fluid passage;

a pressurizing section in which a fluid is sucked by entrainment of a jet flow of the drive fluid jetted from the nozzle and is mixed with the drive fluid jetted from the nozzle; and a needle valve for changing a throttle opening degree of the fluid passage, the needle valve being disposed to be displaced in an axial direction in the fluid passage of the nozzle, wherein:

the needle valve has an end section formed in a tapered shape so that a cross-sectional area of the needle valve decreases toward a top end of the needle valve;

the end section of the needle valve reaches to a downstream side of the throat section in a flow direction of the drive fluid at least when the throttle opening degree is minimum; and the fluid passage is formed into a tapered shape having a cross-sectional area that is gradually decreased by a taper angle θ1 toward an outlet of the fluid from a downstream side of the throttle section to at least the throat section, and the taper angle θ1 of the fluid passage is smaller than a taper angle θ2 of the end section of the needle valve.

6. An ejector according to claim 5, wherein, the fluid passage is formed in a multi-step tapered shape tapered in multiple steps.

7. An ejector according to claim 5, wherein the throat section has an inner periphery surface formed in a curved shape.

8. An ejector cycle comprising:

a compressor for compressing refrigerant;

a high-pressure side heat exchanger for cooling refrigerant discharged from the compressor;

an evaporator for evaporating low-pressure refrigerant after being decompressed;

an ejector including
a nozzle having an inner wall surface for defining a refrigerant passage for decompressing refrigerant from the high-pressure side heat exchanger, the nozzle including a throat section having a cross-sectional area that is the smallest in the refrigerant passage, a pressurizing section in which refrigerant from the evaporator is sucked by entrainment of a jet flow of the refrigerant jetted from the nozzle and is mixed with the refrigerant jetted from the nozzle, and a needle valve for changing a throttle opening degree of the refrigerant passage in the nozzle, the needle valve being disposed to be displaced in an axial direction in the refrigerant passage of the nozzle; and a gas-liquid separator for separating refrigerant flowing from the ejector into a gas refrigerant to be supplied to the compressor and a liquid refrigerant to be supplied to the evaporator, wherein:

the needle valve has an end section formed in a tapered shape so that a cross-sectional area of the needle valve decreases toward a top end of the needle valve;

the end section of the needle valve reaches to a downstream side of the throat section in a flow direction of the refrigerant at least when the throttle opening degree is minimum; and the refrigerant passage of the nozzle has a substantially constant cross-sectional area, in a downstream section downstream from the throat section.

9. An ejector cycle according to claim 8, wherein a refrigerant pressure in the high-pressure side heat exchanger becomes higher than the critical pressure of the refrigerant in an operation mode.

10. An ejector cycle according to claim 8, wherein carbon dioxide is used as the refrigerant.

11. An ejector cycle according to claim 8, wherein the refrigerant passage is formed into a tapered shape having a cross-sectional area that is gradually decreased by a taper angle θ1 toward downstream from a downstream side of the throttle section to the throat section, and the taper angle θ1 of the refrigerant passage is smaller than a taper angle θ2 of the end section of the needle valve.

* * * * *